Nov. 14, 1933.  R. S. HOPKINS  1,935,210

PHOTOGRAPHIC CAMERA CONSTRUCTION

Original Filed Dec. 29, 1928  2 Sheets-Sheet 1

Inventor,
Roy S. Hopkins,
By
Attorneys.

Nov. 14, 1933.　　　　R. S. HOPKINS　　　　1,935,210
PHOTOGRAPHIC CAMERA CONSTRUCTION
Original Filed Dec. 29, 1928　　2 Sheets-Sheet 2
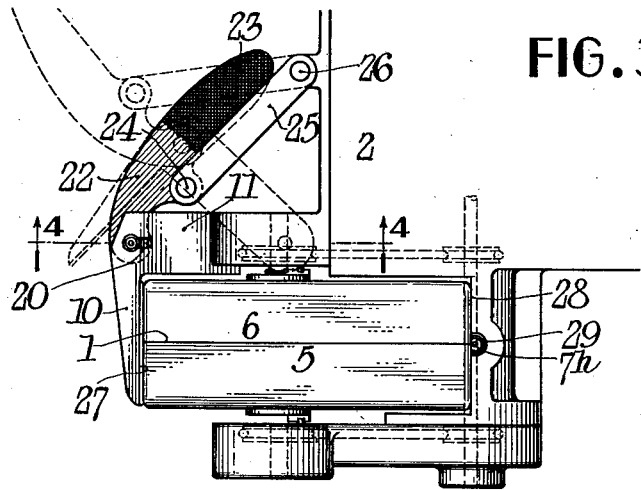
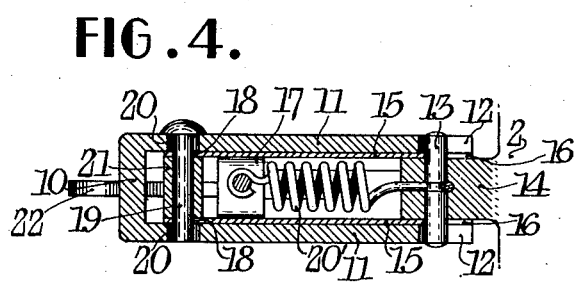
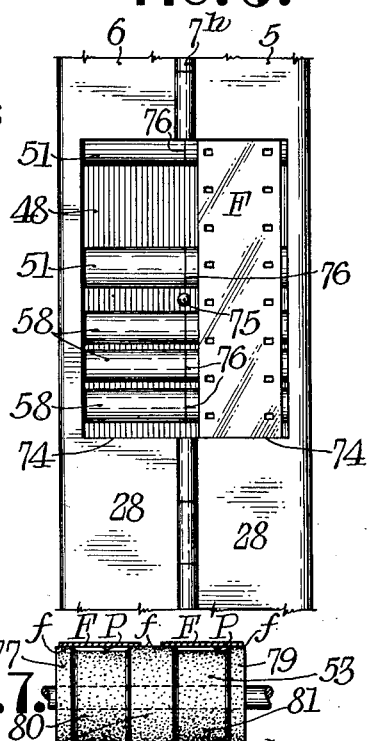
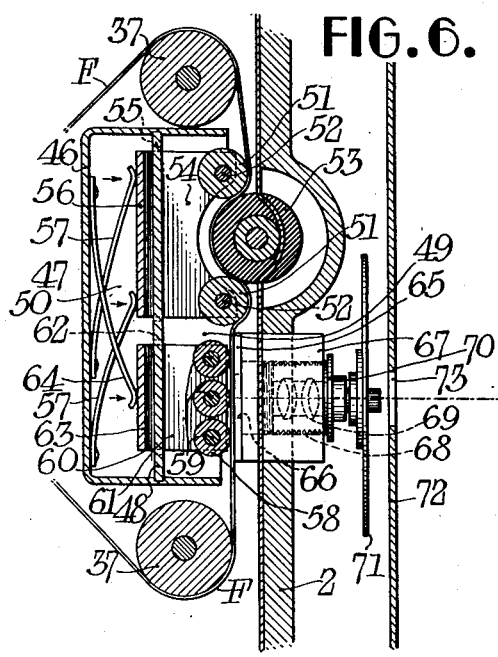
Inventor,
Roy S. Hopkins,
By
Attorneys.

Patented Nov. 14, 1933

1,935,210

UNITED STATES PATENT OFFICE 1,935,210

PHOTOGRAPHIC CAMERA CONSTRUCTION

Roy S. Hopkins, Rochester, N. Y., assignor to Eastman Kodak Company, Rochester, N. Y., a corporation of New York Original application December 29, 1928, Serial No. 329,144. Divided and this application June 23, 1933. Serial No. 677,259

8 Claims. (Cl. 95—34)

This invention relates to photography and more particularly to a photographic camera and magazine construction. One object of my invention is to provide a magazine which may be quickly and easily affixed to a camera in an operative position. Another object is to provide a magazine guide and positioning device on which the magazine may slide towards a support. Another object of my invention is to provide a magazine with a short length of film exposed on one side thereof and arranged so that by moving the magazine up against a support the film will contact with a film-driving roller on the support, thus eliminating all threading of the film through various guideways and sprockets. Another object of my invention is to provide movable parts on a magazine position so that movable parts on the support will automatically come in contact when the magazine has been moved to an operative position. Another object of my invention is to provide a resilient magazine clamp which constantly presses a magazine against a support when the magazine is in an operative position. Another object of my invention is to provide a series of resiliently mounted rollers adapted to hold film upon the driving roller and adapted to hold film flat over an exposure frame when the magazine is in an operative position. Still another object of my invention is to provide a support with a film-moving device and an exposure frame in front of which there is an objective and shutter, both the film-moving device and the exposure frame projecting from a support in position to be contacted with a film carried by a magazine, and other objects will appear from the following specification, the novel features being particularly pointed out in the claims at the end thereof.

The camera and magazine construction described in this specification were primarily designed for a recording machine of the type disclosed in my Patent No. 1,900,878 dated March 7, 1933, which is suitable for machines for producing photographic records of documents, although obviously certain features of the present invention are also equally suitable for other types of cameras.

This application is a division of my copending application for photographic camera and magazine construction, Serial No. 329,144, filed Dec. 29, 1928.

Coming now to the drawings wherein like reference characters denote like parts throughout,—

Fig. 3 is a top plan view showing the magazine-holding clamp which resiliently presses the magazine into a seat formed for the magazine in the support;

Fig. 4 is an enlarged detail sectional view through the clamp on line 4—4 of Fig. 3;

Fig. 5 is a fragmentary front elevation of a portion of a double magazine, such as shown in Fig. 1, a film being carried by one side only of the magazine;

Fig. 6 is an enlarged fragmentary sectional view of a portion of the film-holding structure of the magazine and of the parts with which the film contacts on the support; and Fig. 7 is an enlarged fragmentary side elevation of the friction film-driving roller, the position of films driven thereby being indicated.

In recording machines such as are used in banks for making photographic records of checks and other documents, it is necessary to provide a simple loading device by which film may be positioned for exposure quickly and with the minimum effort.

Figure 1:
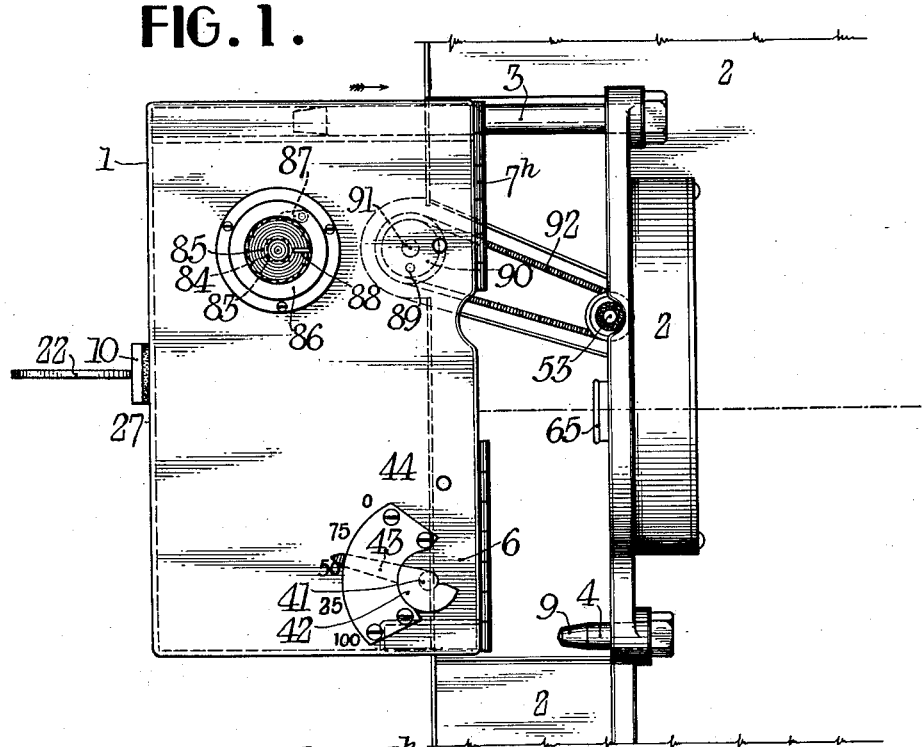
Fig. 1 is a side elevation, partially in section, showing a support and a camera magazine moved partially into its operative position, the support and magazine illustrating a preferred embodiment of my invention.

In Fig. 1 the magazine broadly designated as 1 may be readily positioned on the support 2 which may form a rear wall of a photographing camera. The support 2 is provided with a main guiding post 3 and a supplementary positioning post 4, post 3 projecting a considerable distance from the support and post 4 only projecting a short distance therefrom.

Figure 2:
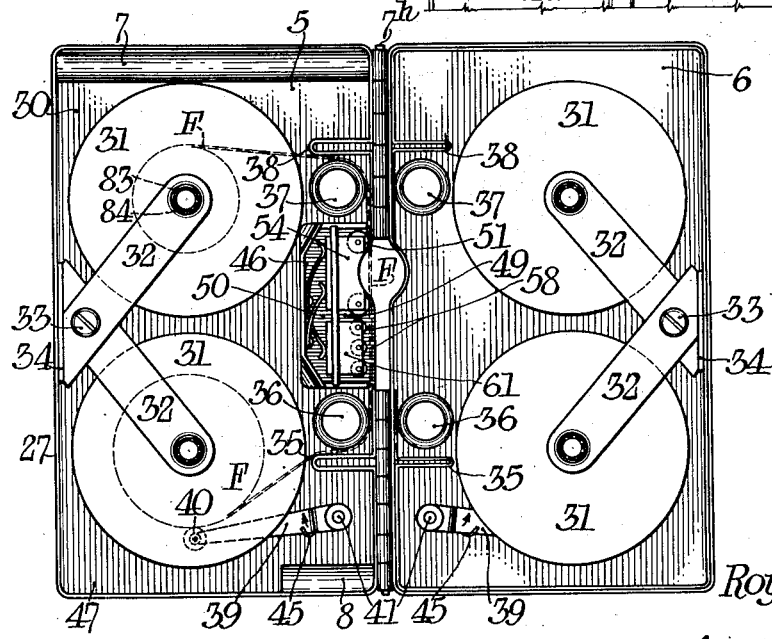
Fig. 2 is a top plan view of a double magazine open as for loading, the magazine being similar to that shown in Fig. 1.

As shown in Fig. 2, one side 5 of the magazine is hinged to a second side 6 at $7^h$. For a double magazine as shown, two of these sides are provided, but if a single magazine is to be used, a cover may be substituted for the side 6.

One side of the magazine 5 may be provided with a pair of tubular members 7 and 8 of such size that they will slide freely over the posts 3 and 4. In order to position the magazine on the support, it is only necessary to enter the post 3 in the tube or opening 7 and slide the magazine in the direction shown by the arrow, Fig. 1, upon the track which is formed by the post 3. As the magazine nears its operative position, the beveled edge 9 of the positioning post 4 enters the tubular member 8 and accurately locates the magazine on its support.

In order to hold the magazine in an operative position, a resilient clamp is used, as shown in Figs. 3 and 4. This clamp consists of a clamp arm 10 which is an extension from a bifurcated arm 11 which is provided with open slots 12 adapted to engage a pin 13 passing through a lug 14 carried by the support 2. Inside of the bifurcated arms 11 there is a U-shaped member, the arms of which 15 are likewise provided with slots 16 engaging pin 13. A cross bar 17 unites these two sides and apertures 18 closely engage the sides of a pin 19 which also passes through slots 20 in the arms 11.

Both of the members above described may, therefore, slide freely upon pin 13 and the arms 11 may slide about pin 19, whereas the arms 18 carry the pin rigidly. A spring 20 connects the cross bar 17 with the pin 13 so that there is a constant tendency to draw pin 19 towards the support 2.

The pin 19 is also rigidly held by means of a post 21 through which the pin 19 passes, this post forming a portion of a handle 22 which is serrated at 23 to facilitate operating. Handle 22 is pivoted at 24 to a link 25 which in turn is pivoted at 26 to a part of the support 2.

Thus by moving the handle 23 from the broken-lined position, Fig. 3, to that shown in full lines in the same figure, the clamping bar 10 will engage the back wall 27 of the magazine and the spring 20 will exert a constant pull upon the post 19 and will, by engaging the end of slot 20, draw in upon the clamping bar 10 so as to resiliently hold the magazine in a seat 28 formed for it in the support 2. The seat 28 is provided with a cut-out 29 having the useful function of acting as a light stop in case a single magazine is employed, since a similar shaped hinge may, of course, be used for a single magazine cover.

Referring to Fig. 2, the magazine itself may consist of a box-like receptacle 30 in which a pair of film reels 31 may be mounted on posts of any standard type upon which they may be held by clamping bars 32, which may be fastened at 33 to a block 34 carried on the rear wall 27 of the magazine. From the lower film reel the film indicated in broken lines at F may be led past a light-stopping guide 35 over a roller 36 straight upwardly over a second roller 37 past a second light-stopping guide 38 and thence to the upper roller 31.

On the lower roller there is preferably provided an arm 39 having a roller 40 adapted to lie in contact with the convolution of film and being supported by a shaft 41. Shaft 41, as indicated in Fig. 1, extends through the walls of the magazine and terminates in a plate 42 and an indicating arm 43, the latter operating over a scale 44 on the outside of the magazine to show the amount of film in the magazine.

The arms 39 are spring-pressed in the direction shown by arrows, only the end of the spring 45 showing in Fig. 2. The plate 42 is of irregular shape and is adapted to contact with an automatic machine control which is shown in my Patent 1,897,903.

As thus far described, both sides 5 and 6 of the double magazine are exactly alike. One side, however, must be provided with a film-positioning device and if the magazine is a single one, this device will lie wholly within the box-like structure on one side. But if it is a double one, as shown in Fig. 5, the positioning roller, while attached to only one side, will extend across both sides, as will be hereinafter more fully described.

As shown in Figs. 2 and 6, a small box-like structure 46 extends upwardly from wall 47 of the magazine and this box-like structure is provided with a wall 48 dividing it into two sections 49 and 50. In section 49 there are a pair of rollers 51 mounted on shafts 52 positioned radially of a frictional film-driving roller 53. Shafts 52 are carried by side walls 54 of a U-shaped member, these side walls passing through slots 55 in the partition 48. A rear wall 56 connects the side walls 54.

As shown best in Fig. 6, in the rear chamber 50 there are a pair of spring fingers 57 which press the rear wall 56 in the direction shown by the arrows. These springs form a type of universal joint which permits considerable movement of the carriage for the rollers 51 which is formed by the side walls 54 and the rear wall 56.

Thus, as the magazine is moved toward its support, the rollers 51 are permitted sufficient movement to seat themselves against the frictional driving roller 53 and to press a film firmly thereon.

A second set of rollers 58 are carried by shafts 59, which are supported on a carriage 60, the side arms of which 61 pass through slots 62 and the rear wall of which 63 is pressed by a spring arm 64 in the direction shown by arrow. This set of rollers is adapted to press a film F flat against an exposure frame 65.

This frame is merely a flat plate in which there is a window 66 through which an exposure may be made and it is fastened to a block 67 which is inserted in or which may form a part of the support 2. This block is apertured and the front part of the aperture is threaded, as indicated at 68. An objective 69 is carried by a cell 70 which is screwed into the threaded aperture. Thus the block constitutes a small camera when the magazine is in place and a film F is pressed over the exposure aperture 66.

In front of the objective there is a shutter formed of an apertured disc 71, but since this type of shutter is well known in the photographic art, it will not be further described. The shutter lies close to a light-protecting plate 72 which is apertured at 73 to permit an image to be photographed therethrough.

As shown in Fig. 5, the rollers 51 and 58 extend across the front of apertures 74 cut in the front walls 28 of the magazine sections 5 and 6, which are hinged together at 7. If desired, a post 75 may be placed on the partition wall 48 so as to keep the films F from riding over. As also shown in Fig. 5, the rollers 51 and 58 are preferably divided into two parts on a central line 76, these two parts being both mounted on a single shaft.

The reason for this is that it permits two films to be threaded more easily. I prefer to make the rollers 51 and 58 of an especially treated wood which is smooth and which does not require lubrication, and I prefer to make the friction-driving roller 53 of rubber.

As shown in Fig. 7, I prefer to make the periphery of the roller in the form of three ridges or projections 77, 78 and 79, leaving portions of smaller diameter 80 and 81 between these ridges thus roller 53 has a relieved periphery. This permits the friction roller to contact with only the edges of the film $f$ and leaves the sensitive picture area P free from contact with the driving roller, so that no part of the surface used for making a photograph comes in contact with the friction drive.

Since the rollers 59 contact across the entire width of a film 50 held against the exposure frame 65, the film is prevented from buckling and is held flat in the focal plane of the objective 69.

In order to wind the film on a take-up roller which is the upper roller, as viewed in Fig. 2, a shaft 83 is provided with a four-sided portion 84, as indicated in Fig. 1, this portion engaging a square aperture in a flange of the film reel 31 in a well known manner. Affixed to shaft 83 is a ratchet wheel 85, this wheel turning in a cell 86 in which there is mounted a pawl 87 which prevents the spool from being turned in one direction.

Ratchet wheel 86 has affixed thereto a flange 88 and this flange may be engaged by a driving pin 89 carried by a pulley 90 mounted to turn upon a shaft 91 and which may be operated by a spring belt 92, which may be driven by any suitable source of power.

It will be evident that when the magazine 1, as indicated in Fig. 1, is guided into its seat upon the track 3, that the flange 88 will lie in the path of the driving pin 89, since the shafts 83 and 91 are coaxial when the magazine is in its operative position. When the machine starts, therefore, pin 89 will be brought into engagement with flange 88 and will turn the take-up spool.

Should the flange 88 contact with the pin 89 as the magazine is loaded, the pin will be thrust to one side as some movement is permitted due to the pulley 90, which may be slipped relative to the belt 92, since this belt is comparatively loose. The size of the pulley and power drive is arranged so that the spool 31 will always tend to move slightly faster than film can be taken up. Therefore, it is necessary to arrange the belt 92 with a certain slippage which will compensate satisfactorily for the varying diameter of the take-up roll.

It should be especially noticed with the construction above described that it is only necessary to enter the post 3 in aperture 7 and slide the magazine into its seat 28, after which handle 23 may be moved to resiliently clamp the magazine in place. This action not only positions the magazine, but it stretches the film resiliently about the friction film drive 53 and also presses the film flat against the exposure window 67. The take-up film spool drive is also automatically positioned by this movement so that the driving flange 88 lies in the path of the driving pin 89. Thus the single operation of positioning the magazine equips the camera for taking pictures.

What I claim as new and desire to be secured by Letters Patent of the United States is:

1. A film camera, designed for use with an interchangeable film cassette having an opening through which the film contained therein is adapted to be exposed, said camera comprising an objective, a shutter, and an exposure frame permanently located behind the objective in the field of the objective, the exposure frame being so dimensioned and shaped with reference to the cassette that it is adapted to extend into said opening in the cassette and to contact with film carried inside of the cassette when the cassette is carried by the camera.

2. A film camera, designed for use with an interchangeable film cassette having an opening through which the film contained therein is adapted to be exposed, said camera comprising an objective, a shutter, and an exposure frame permanently located behind the objective in the field thereof, means carried by the camera for positioning a cassette behind the objective, the exposure frame of said camera being so dimensioned and shaped with reference to the opening in the cassette that it is adapted to extend through said opening and to contact with film contained in said cassette when said cassette is positioned by the camera behind the objective.

3. A film camera, designed for use with an interchangeable cassette having an opening through which the film contained therein is adapted to be exposed, said cassette also including parts adapted to engage said camera, said camera comprising an objective, a shutter, an exposure frame permanently located behind the objective and in the field of the objective, means carried by the camera and adapted to be engaged by parts of said cassette for guiding said cassette into an operative position behind said objective, the exposure frame of said camera being so dimensioned and shaped with reference to the cassette opening that it is adapted to extend into said opening in the cassette and to contact with film carried by the cassette when the cassette is guided into an operative position behind said objective.

4. In a film camera, designed for use with an interchangeable film cassette having an opening through which the film contained therein is adapted to be exposed, said camera comprising an objective, a shutter, and an exposure frame permanently located behind the objective and in the field thereof, means carried by the camera adapted to cooperate with said cassette and to guide said cassette into an operative position behind the objective, a latch carried by the camera adapted to hold said cassette in said operative position, the exposure frame of said camera being so dimensioned and shaped with reference to the cassette opening that it is adapted to extend into said opening in the cassette and contact with film therein when said cassette is latched in an operative position relative to said camera.

5. A film camera, designed for use with an interchangeable film cassette having an opening through which the film contained therein is adapted to be exposed, said camera comprising an objective, a shutter, and an exposure frame permanently located behind the objective in the field of the objective, a resilient clamping device carried by the camera and adapted to press a cassette into an operative relation with said camera, the exposure frame of said camera being so dimensioned and shaped with reference to the cassette opening that it is adapted to extend into said opening in said cassette and contact with film therein when said cassette is resiliently pressed into an operative relation with said camera.

6. A film camera, designed for use with an interchangeable film cassette having an opening through which the film contained therein is adapted to be exposed, said camera comprising an objective, a shutter, an exposure frame permanently located behind the objective in the field of the objective, a slideway adapted to receive said cassette on which said cassette may slide axially of said objective, the exposure frame of said camera being so dimensioned and positioned with reference to said slideway and to the cassette opening that it is adapted to extend into the opening in the cassette and contact with film therein when said cassette is moved through the camera slideway into an operative position with respect to the camera.

7. A film camera for an interchangeable cassette having an opening in a wall thereof through which the film contained therein is adapted to be exposed, said camera including a wall, an objective carried by the wall, a rearward extension carried by the wall behind said objective, an exposure frame carried by said rearward extension in fixed relation to said objective, a shutter carried by the camera and adapted to admit and exclude light from passing through said objective to said exposure frame, the exposure frame being adapted to extend into said cassette opening and to locate therein the focal plane of the objective.

8. A film camera for an interchangeable cassette having an opening in a wall thereof through which the film contained therein is adapted to be exposed, said camera including a wall, an objective carried by the wall, a rearward extension carried by the wall behind said objective, an exposure frame carried by said rearward extension, comprising an apertured film locating plate at least two sides of which lie in a fixed position with reference to the focal plane of the objective, a shutter carried by the camera and adapted to admit and exclude light from passing through said objective to said exposure frame, the exposure frame being adapted to extend into said cassette opening and to locate therein the focal plane of the objective.

ROY S. HOPKINS.